United States Patent
Okutani

(10) Patent No.: US 9,100,512 B2
(45) Date of Patent: Aug. 4, 2015

(54) READING APPARATUS AND METHOD OF CONTROLLING THE SAME

(71) Applicant: CANON KABUSHIKI KAISHA, Tokyo (JP)

(72) Inventor: Yasuo Okutani, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/906,157

(22) Filed: May 30, 2013

(65) Prior Publication Data

US 2013/0329264 A1 Dec. 12, 2013

(30) Foreign Application Priority Data

Jun. 7, 2012 (JP) .................................. 2012-129884
May 7, 2013 (JP) .................................. 2013-097733

(51) Int. Cl.
| | |
|---|---|
| H04N 1/04 | (2006.01) |
| H04N 1/00 | (2006.01) |
| G06K 9/00 | (2006.01) |
| H04N 1/195 | (2006.01) |
| H04N 1/32 | (2006.01) |

(52) U.S. Cl.
CPC ........ *H04N 1/00018* (2013.01); *G06K 9/00355* (2013.01); *G06K 9/00375* (2013.01); *H04N 1/00687* (2013.01); *H04N 1/00737* (2013.01); *H04N 1/00742* (2013.01); *H04N 1/00336* (2013.01); *H04N 1/00347* (2013.01); *H04N 1/19594* (2013.01); *H04N 1/32358* (2013.01); *H04N 2201/0081* (2013.01); *H04N 2201/0087* (2013.01); *H04N 2201/0436* (2013.01)

(58) Field of Classification Search
CPC .......... H04N 1/00018; H04N 1/00336; H04N 1/00347; H04N 1/00687; H04N 1/00737; H04N 1/00742; H04N 1/19594; H04N 1/32358; H04N 2201/0081; H04N 2201/0436; H04N 2201/0087; G06K 9/0035; G06K 9/00375
USPC .................................. 358/488, 486, 493, 474
See application file for complete search history.

(56) References Cited

U.S. PATENT DOCUMENTS 6,256,411 B1 * 7/2001 Iida ................................ 382/203

FOREIGN PATENT DOCUMENTS

| | | |
|---|---|---|
| CN | 1659877 A | 8/2005 |
| CN | 1921542 A | 2/2007 |
| CN | 101500055 A | 8/2009 |
| JP | 2005-025247 A | 1/2005 |

* cited by examiner

Primary Examiner — Houshang Safaipour
(74) Attorney, Agent, or Firm — Canon USA, Inc., IP Division

(57) ABSTRACT

A reading apparatus includes a first generation unit, a determination unit, a second generation unit, and an association unit. The first generation unit generates data of a first target object obtained by using an image capture unit attached above a reading platen to read the first target object placed in a reading area of the reading platen. The determination unit determines, in a state where the first target object is placed in the reading area, whether a second target object has been placed in the reading area. The second generation unit generates data of a second target object obtained by using the image capture unit to read the second target object. The association unit associates, in response to determining that the second target object has been placed in the reading area, the data of the first target object with the data of the second target object.

11 Claims, 16 Drawing Sheets

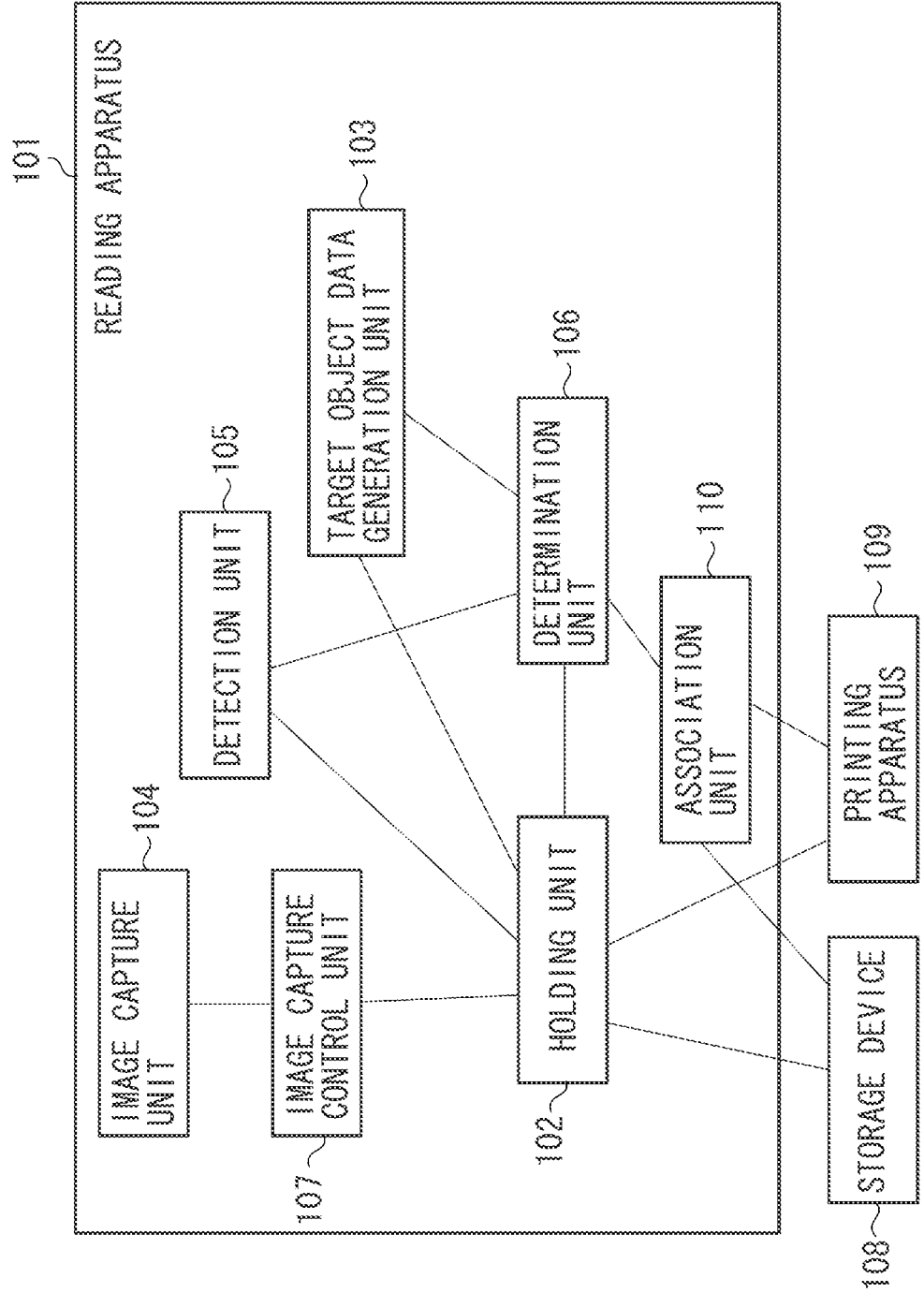

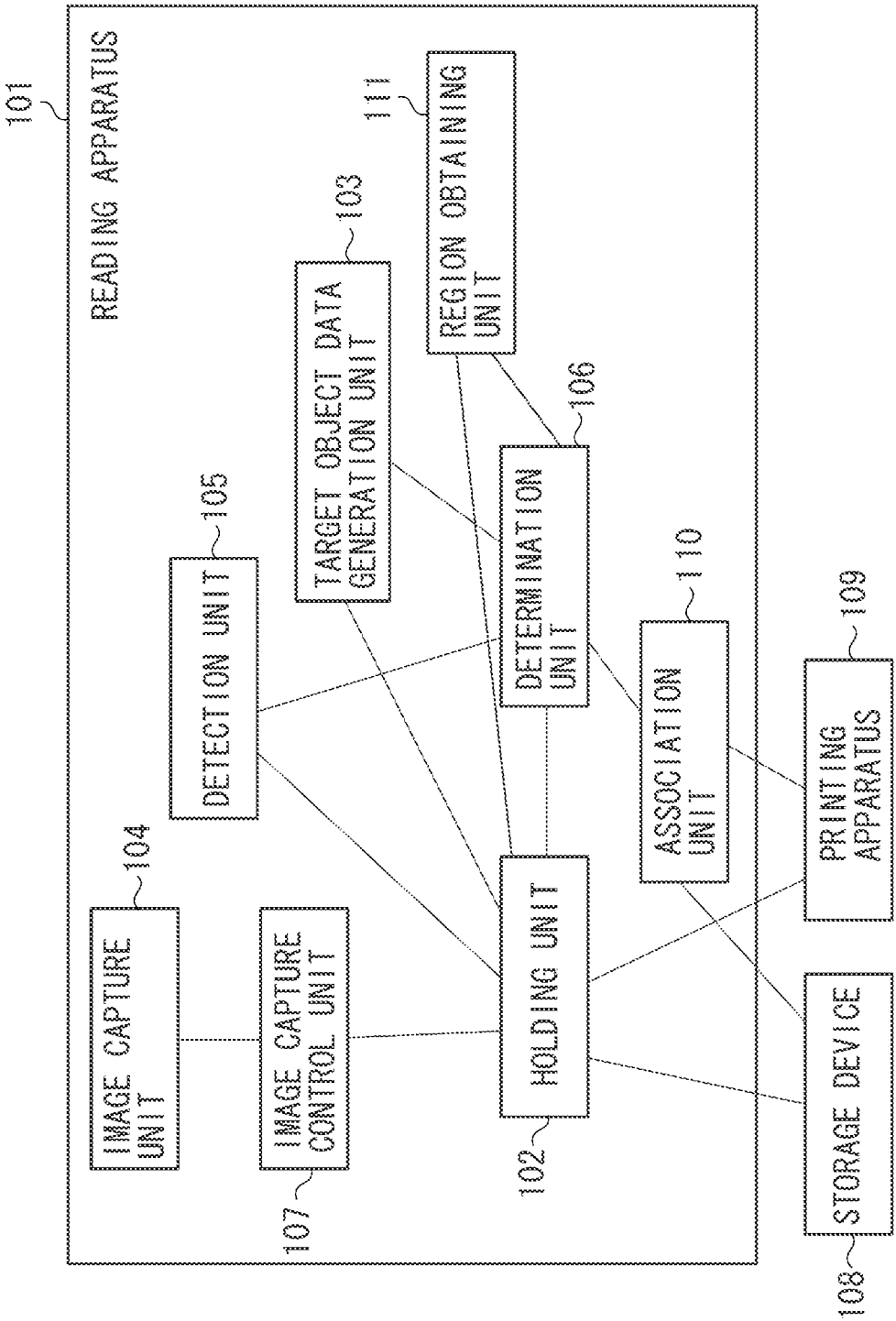

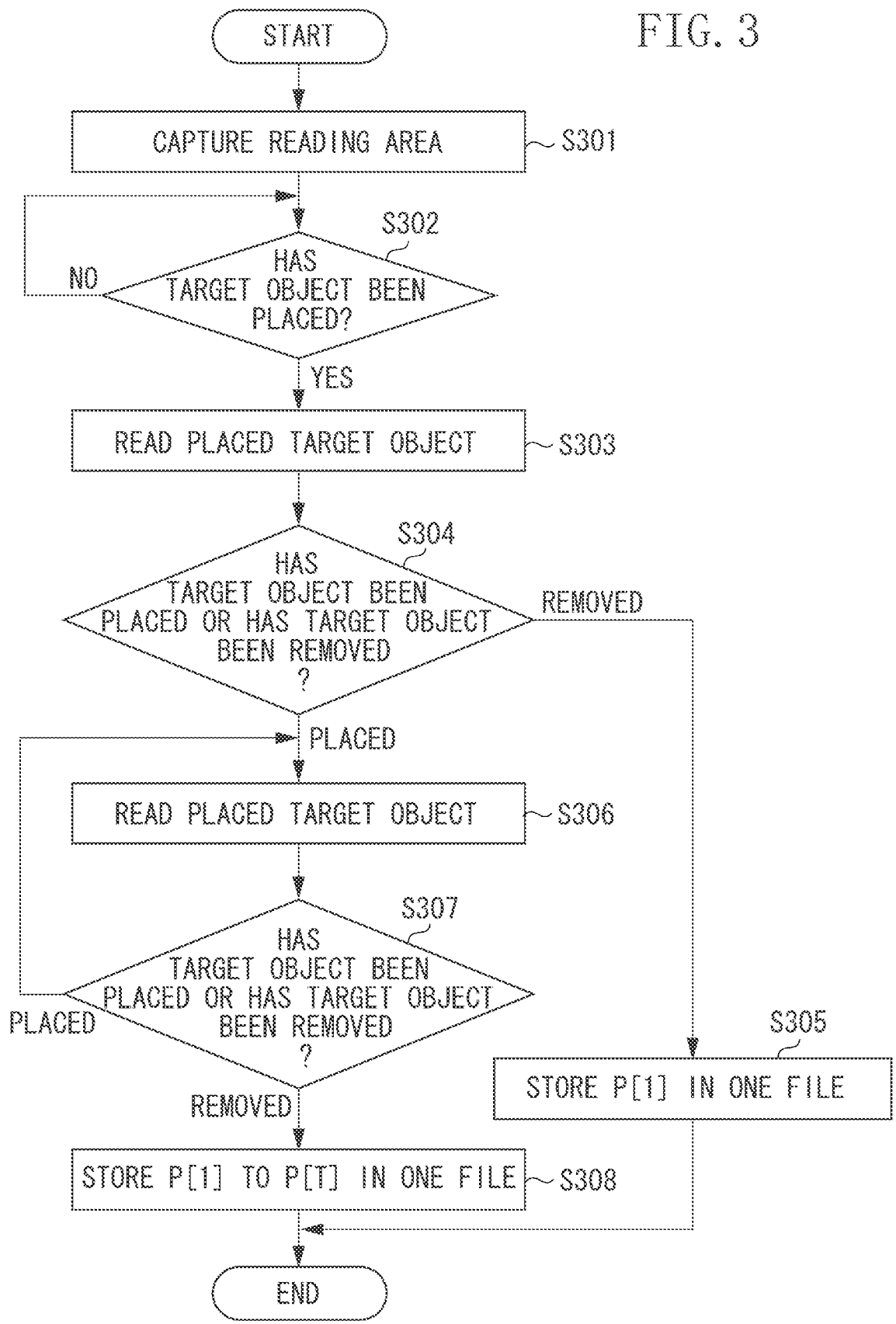

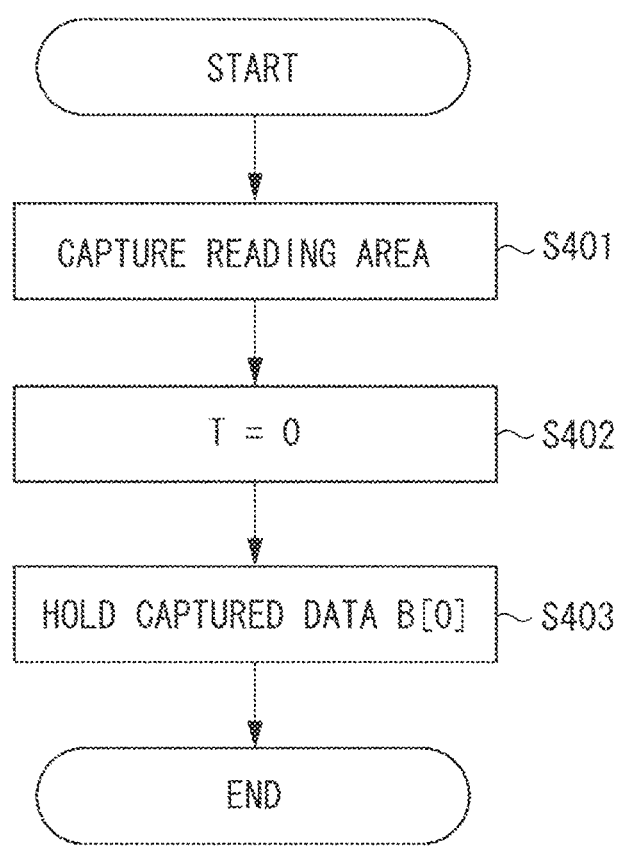

READING APPARATUS AND METHOD OF CONTROLLING THE SAME

BACKGROUND OF THE INVENTION

1. Field of the Invention

The present invention relates to a reading apparatus that reads a target object using an image capture unit attached above a reading platen.

2. Description of the Related Art

Many currently prevalent reading apparatuses read a document placed face down on a document platen, using a scanner. In recent years, however, reading apparatuses has been discussed that read a document placed face up on a document platen, using an image capture unit attached above the document platen.

Japanese Patent Application Laid-Open No. 2005-25247 discusses a method of placing a document to be processed on top of an already processed document without removing the already processed document, and processing the document, when processing a plurality of documents one by one.

Japanese Patent Application Laid-Open No. 2005-25247, however, employs a method of processing documents one by one, but does not describe the process of storing stacked documents in one file. Thus, it is not possible to store documents subjected to a series of processes in one file. Consequently, to store a plurality of documents in one file, a user needs to perform the process of combining a plurality of documents into one file after the plurality of documents are read.

SUMMARY OF THE INVENTION

The present invention is directed to associating data of a plurality of pieces of read target object with one another based on an action performed on a target object by a user.

A reading apparatus according to the present invention includes a first generation unit configured to generate data of a first target object obtained by using an image capture unit attached above a reading platen to read the first target object placed in a reading area of the reading platen, a determination unit configured to determine, in a state where the first target object is placed in the reading area, whether a second target object has been placed in the reading area by a user, a second generation unit configured to generate data of a second target object obtained by using the image capture unit to read the second target object placed in the reading area, and an association unit configured to associate, in response to the determination unit determining that the second target object has been placed in the reading area, the data of the first target object with the data of the second target object.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 1A and FIG. 1B are block diagrams illustrating a reading apparatus 101 according to the present invention.

FIG. 3 is a flow chart illustrating the processing performed by a reading apparatus 101 according to a first exemplary embodiment.

FIG. 4 is a detailed flow chart of step S301.

DESCRIPTION OF THE EMBODIMENTS

Various exemplary embodiments, features, and aspects of the invention will be described in detail below with reference to the drawings.

Figure 2A:
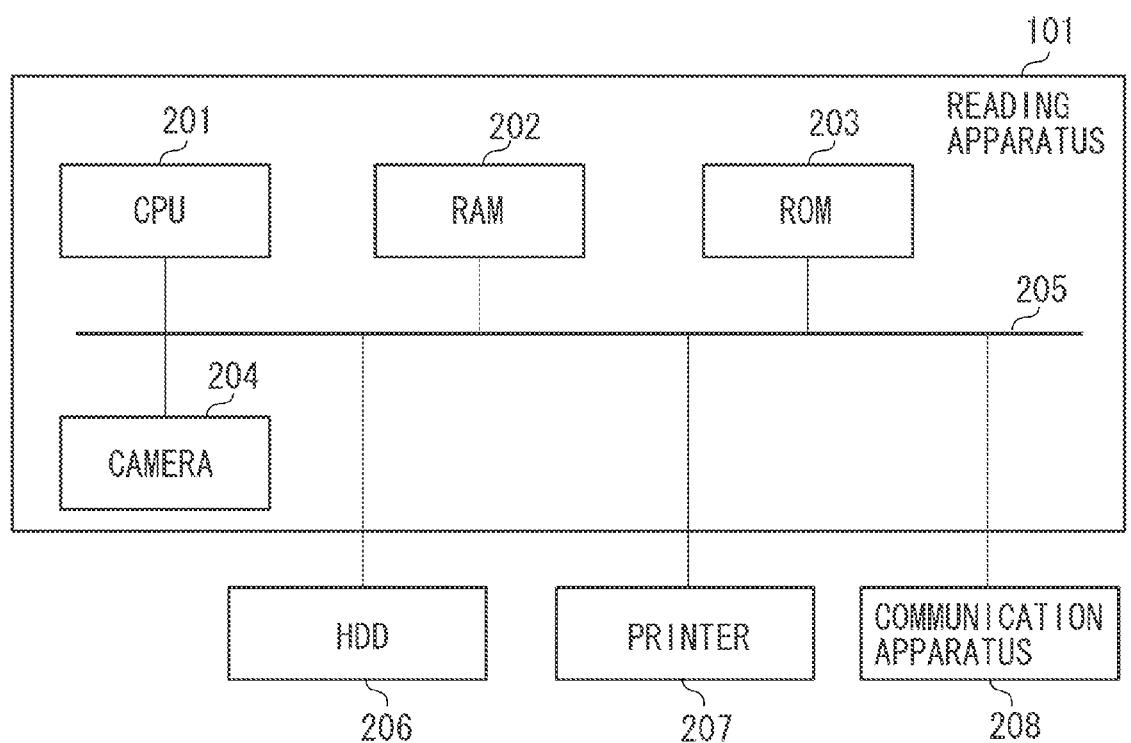
FIG. 2A is a hardware configuration diagram illustrating the reading apparatus 101 according to the present invention.

A first exemplary embodiment is described. FIG. 2A is a configuration diagram illustrating the hardware configuration of a reading apparatus 101. FIG. 2A illustrates a central processing unit (CPU) 201, a random access memory (RAM) 202, a read-only memory (ROM) 203, a camera 204, a system bus 205, a hard disk drive (HDD) 206, a printer 207, and a communication apparatus 208. The system bus 205 connects the components in the reading apparatus 101 to one another to transmit and receive signals among the components. The HDD 206 is an external storage device.

FIG. 1A is a functional block diagram illustrating a reading apparatus 101 according to the first exemplary embodiment.

Figure 2B:
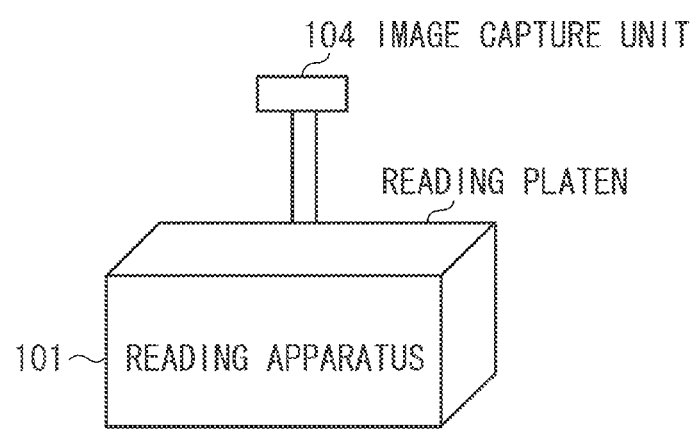
FIG. 2B is an external view of the reading apparatus 101 according to the present invention.

An image capture unit 104 is an image capture unit such as a camera or a video camera. FIG. 2B is an external view of the reading apparatus 101. The image capture unit 104 is attached above a reading platen and captures a target object placed face up and the hand of a user on the reading platen. The range that can be captured by the image capture unit 104 is defined as a reading area. Here, it is assumed that the size of the reading platen is equal to the size of the reading area.

An image capture control unit 107 is a unit configured to control the image capture unit 104 and includes the CPU 201 and the like. The image capture control unit 107 loads a program or data stored in the ROM 203 into the RAM 202 to execute the program or the data. The image capture control unit 107 controls the timing of reading a target object, and also controls a detection area.

A holding unit 102 corresponds to the RAM 202 and holds captured data. The captured data is data obtained by capturing the reading area using the image capture unit 104. The holding unit 102 also holds target object data (read data), information about a target object, and information about a detected hand.

A target object data generation unit 103 includes the CPU 201 and the like. The target object data generation unit 103 loads a program or data stored in the ROM 203 into the RAM 202 to cut out a plurality of target objects automatically, obtains the coordinates on the reading platen of a target object, and generate data of target object.

A detection unit 105 includes the CPU 201 and the like. The detection unit 105 loads a program or data stored in the ROM 203 into the RAM 202 to detect the presence or absence of the hand of the user and a target object, and also detect the motions and the positions of the hand of the user and a target object.

A determination unit 106 includes the CPU 201 and the like. The determination unit 106 loads a program or data stored in the ROM 203 into the RAM 202 to determine whether the user has placed a target object or removed a target object. The determination unit 106 makes the determination using target object data generated by the target object data generation unit 103, information about the hand of the user detected by the detection unit 105, or the motions of the hand of the user and the target object also detected by the detection unit 105.

An association unit 110 includes the CPU 201 and the like. The association unit 110 loads a program or data stored in the ROM 203 into the RAM 202 to associate pieces of read data held in the holding unit 102 with one another, and store the associated pieces of read data in a file.

A storage device 108 corresponds to the HDD 206 and holds data held in the holding unit 102, as stored data. The stored data includes captured data of the reading area and read data.

A printing apparatus 109 corresponds to the printer 207 and prints data held in the holding unit 102.

It should be noted that in the illustrated example, the image capture unit 104 is provided within the reading apparatus 101, but may be an external apparatus. Further, in the illustrated example, the storage device 108 and the printing apparatus 109 are external apparatuses, but may be provided within the reading apparatus 101. Moreover, here, the target object data generation unit 103 and the detection unit 105 are described as separate units, but maybe implemented by one unit as detection unit. Furthermore, another apparatus or device may perform one or more functions other than that of the image capture unit 104 by distributed processing (including cloud computing).

Further, FIG. 2B illustrates the case where the image capture unit 104 is attached above the reading platen. But not limited thereto, the image capture unit 104 may be attached to a given position. As an example, the image capture unit 104 maybe attached to the side of the reading platen and obliquely capture a target object. In this case, the image capture unit 104 performs image processing on the obliquely captured data to correct the distortion of the data. This enables the obtainment of data similar to data captured from above. As another example, the image capture unit 104 may be embedded in the reading platen and attached to capture a target object above, and a reflection plate such as a mirror may be installed above the reading platen, so that the image capture unit 104 may capture an image of the target object obtained through the reflection plate.

FIG. 3 is a flow chart illustrating the processing performed by the reading apparatus 101 according to the first exemplary embodiment.

In step S301, the image capture unit 104 captures the reading area on the reading platen. The holding unit 102 holds the captured data. It should be noted that the data captured and held in step S301 is data obtained by capturing the reading platen in a state where a reading target such as a document or a target object is not placed on the reading platen.

In step S302, the image capture unit 104 captures the reading area on the reading platen, and the determination unit 106 determines whether a target object has been placed in the reading area on the reading platen. If the determination unit 106 has determined that a target object has not been placed in the reading area on the reading platen (NO in step S302), the processing returns to step S302. If the determination unit 106 has determined that a target object has been placed in the reading area on the reading platen (YES in step S302), the processing proceeds to step S303.

In step S303, the image capture unit 104 captures the target object, and the holding unit 102 holds the captured data. Here, the image capture unit 104 may cut target object data (read data) out of the data captured in step S302, or the image capture unit 104 may newly capture the reading area on the reading platen to obtain target object data. The target object data generation unit 103 generates the target object data from the captured data.

In step S304, the image capture unit 104 captures the reading platen, and the determination unit 106 determines whether a target object has been newly placed in the reading area on the reading platen or the target object present in the reading area on the reading platen has been removed. If the determination unit 106 has determined that a target object has been placed on the reading platen (PLASED in step S304), the processing proceeds to step S306. If the determination unit 106 has determined that the target object present on the reading platen has been removed (REMOVED in step S304), the processing proceeds to step S305.

In step S305, the association unit 110 stores the data of the removed target object in one file. Here, the association unit 110 stores the target object data held in the holding unit 102 in step S303, as target object data P[1] in one file in the storage device 108. In the illustrated example, the association unit 110 stores the data in the storage device 108 which is an external storage device. Alternatively, the holding unit 102 provided within the reading apparatus 101 may hold the data.

In step S306, the image capture unit 104 captures the target object, and the holding unit 102 holds the captured data. Here, the image capture unit 104 may cut target object data (read data) out of the data captured in step S304, or the image capture unit 104 may newly capture the reading area on the reading platen to obtain target object data. The target object data generation unit 103 generates the target object data from the captured data.

In step S307, the image capture unit 104 captures the reading platen, and the determination unit 106 determines whether a target object has been newly placed in the reading area on the reading platen or the target object has been removed from the reading area on the reading platen. The process of step S307 is similar to the process of step S304. If the determination unit 106 has determined that a target object has been placed on the reading platen (PLASED in step S307), the processing returns to step S306. If the determination unit 106 has determined that the target object has been removed (REMOVED in step S307), the processing proceeds to step S308.

In step S308, the association unit 110 associates the plurality of pieces of previously read target object data with one another to be stored in the same file. Then, the association unit 110 stores the associated pieces of data in one file. Here, the association unit 110 connects the plurality of pieces of target object data (pieces of target object data P[1], P[2], and P[T]; "T" represents the number of times of reading) held in the holding unit 102 to one another in the order of reading, thereby forming one file, gives one file name to the file, and stores the file in the storage device 108.

It should be noted that the file name may be input by the user, or maybe automatically assigned based on a certain rule, when the file is stored. Here, in the illustrated example, the association unit 110 stores the file in the storage device 108 which is an external storage device. Alternatively, the holding unit 102 provided within the reading apparatus 101 may hold the file.

It should be noted that the process of step S301 may not need to be performed every time the processing illustrated by the flow chart of FIG. 3 is performed. For example, if the imaging capturing environment does not change, step S301 may be performed initially, or may be performed periodically.

FIG. 4 is a detailed flow chart of step S301 of FIG. 3.

In step S401, the image capture unit 104 captures the reading area on the reading platen to obtain the captured data (captured data obtainment).

In step S402, the determination unit 106 sets T=0.

In step S403, the holding unit 102 stores the captured data captured by the image capture unit 104 in step S401, as captured data B[0]. It should be noted that the captured data B[0] is image data of the reading area in a state where a target object is not placed in the reading area on the reading platen.

Figure 5:
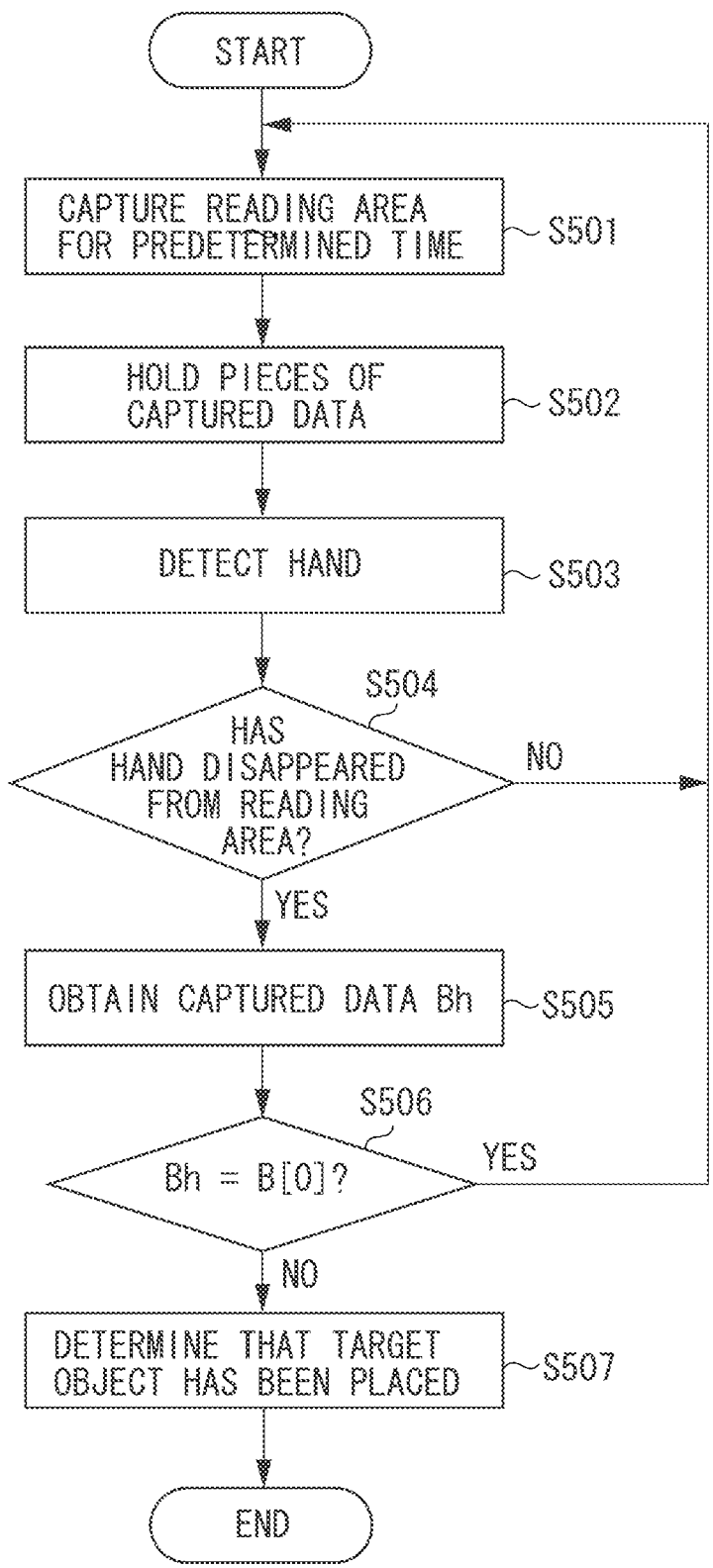
FIG. 5 is a detailed flow chart of step S302.

FIG. 5 is a detailed flow chart of step S302 of FIG. 3.

In step S501, the image capture unit 104 captures the reading area on the reading platen multiple times at predetermined time intervals.

In step S502, the holding unit 102 holds the plurality of pieces of captured data captured by the image capture unit 104 in step S501.

In step S503, the detection unit 105 detects a hand present in the reading area using the plurality of pieces of captured data held in the holding unit 102. Here, it is assumed that the user uses their hand to place a target object on the reading platen. Accordingly, the hand is detected in the reading area during the action of placing a target object. It should be noted that the detection unit 105 uses an existing technique to detect the hand. Examples of the technique include a method of determining a flesh color to detect the hand, and a method of identifying a shape to detect the hand.

In step S504, the determination unit 106 determines whether the hand has disappeared from the reading area. The determination unit 106 makes the determination using a detection result from the detection unit 105. If the determination unit 106 has determined that the hand has disappeared from the reading area (YES in step S105), the processing proceeds to step S505. If the determination unit 106 has determined that the hand is present in the reading area (NO in step S105), the processing returns to step S501.

In step S505, the image capture unit 104 captures the reading area on the reading platen to obtain the captured data as captured data Bh. The holding unit 102 holds the captured data.

In step S506, the determination unit 106 determines whether the captured data B[0] of the reading area in a state where a target object is not placed in the reading area matches the captured data Bh held in holding unit 102 in step S505.

In step S506, if the determination unit 106 has determined that the captured data B[0] matches the captured data Bh (YES in step S506), the processing returns to step S501.

If the determination unit 106 has determined that the captured data B[0] does not match the captured data Bh (NO in step S506), the processing proceeds to step S507. The captured data B[0] matching the captured data Bh means that a target object has not been placed in the reading area on the reading platen. On the other hand, the captured data B[0] not matching the captured data Bh means that a target object has been placed in the reading area on the reading platen.

In step S507, the determination unit 106 determines that a target object has been placed in the reading area on the reading platen.

It should be noted that the process of step S505 may not be performed, and one of the pieces of captured data after the disappearance of the hand among the plurality of pieces of captured data held in the holding unit 102 in step S502 may be used in step S506, instead of the captured data held in the holding unit 102 in step S505. One of the pieces of captured data after the disappearance of the hand among the plurality of pieces of captured data may be, for example, the piece of captured data captured last among the plurality of pieces of captured data.

When determining in step S506 whether the captured data B[0] matches the captured data Bh, the determination unit 106 may obtain difference between the captured data B[0] and the captured data Bh to determine whether there is no difference. The determination unit 106 obtains the difference by obtaining deference of each pixel of captured data.

When making the determination using the difference in step S506, the determination unit 106 may determine whether the difference is smaller than a predetermined value, instead of determining whether there is no difference. The determination of whether the difference is smaller than the predetermined value can reduce the possibility of an erroneous recognition based on the determination that a target object has been placed when a target object has not been placed in the reading area.

Figure 6:
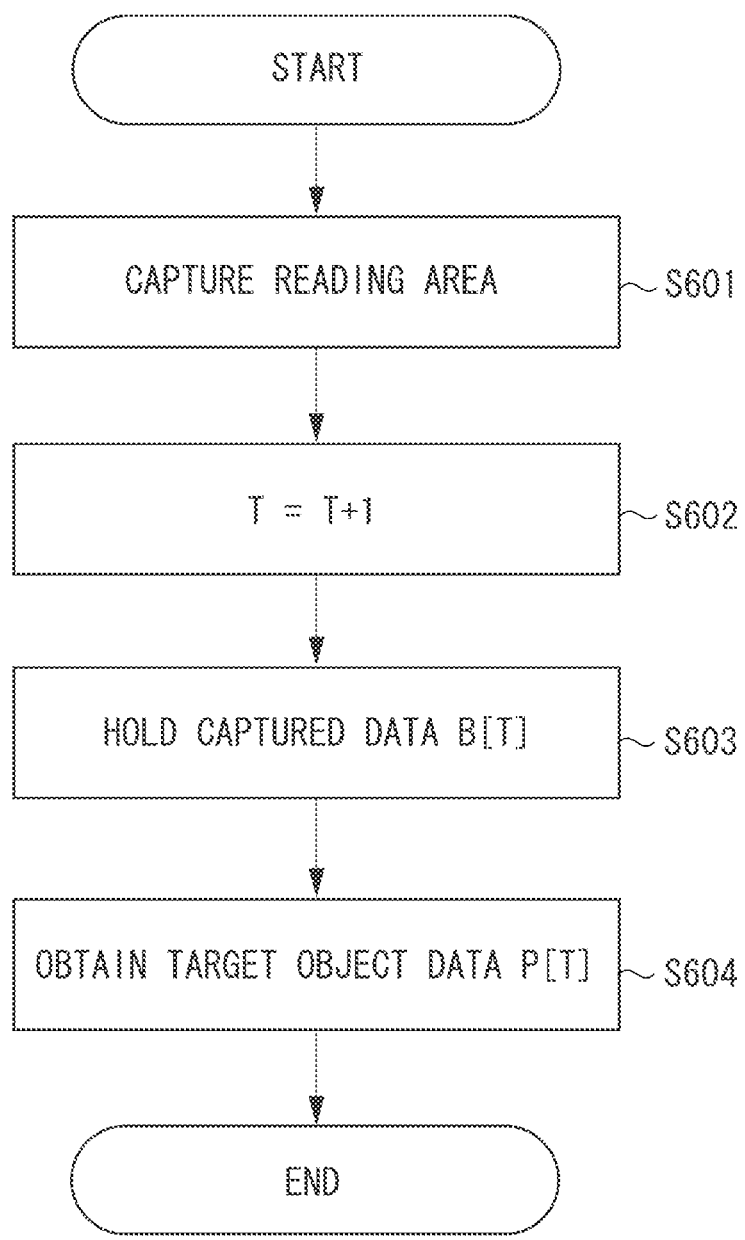
FIG. 6 is a detailed flow chart of steps S303 and S306.

FIG. 6 is a detailed flow chart of steps S303 and S306 of FIG. 3. The processes of steps S303 and S306 of FIG. 3 are similar to each other, and the processing illustrated by the flow chart of FIG. 6 is performed in each of steps S303 and S306.

In step S601, the image capture unit 104 captures the reading platen.

In step S602, the determination unit 106 sets T=T+1.

In step S603, the holding unit 102 holds the captured data captured by the image capture unit 104 in step S601, as captured data B[T].

In step S604, the target object data generation unit 103 generates target object data P[T] based on the captured data B[T] and the captured data B[T−1] held in the holding unit 102. The holding unit 102 holds the generated target object data P[T]. The target object data generation unit 103 generates the target object data P[T] by calculating B[T]−B[T−1] and cutting out the data only of the region of the target object.

Figure 7:
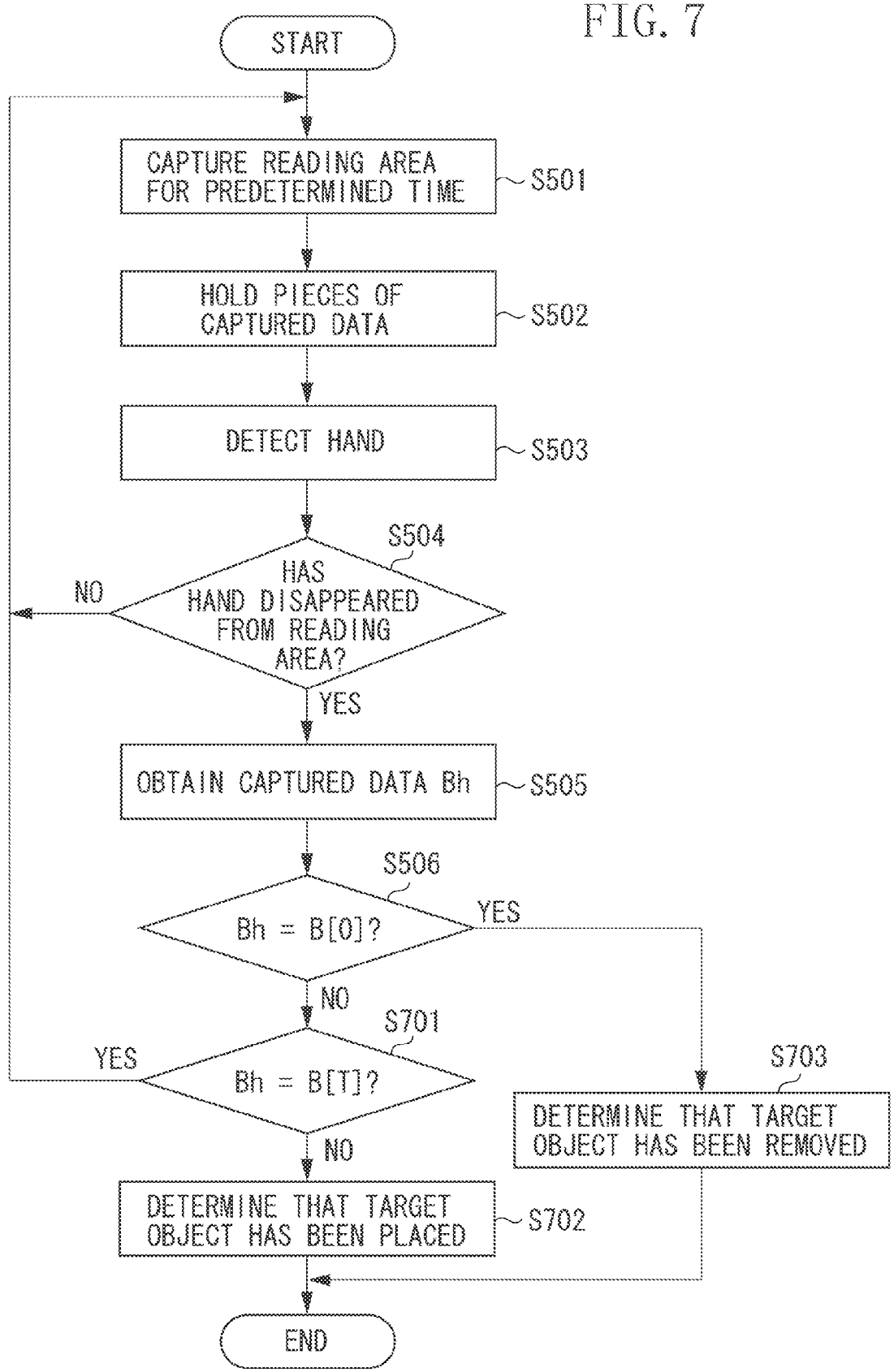
FIG. 7 is a detailed flow chart (method 1) of steps S304 and S307.

FIG. 7 is a detailed flow chart (method 1) of steps S304 and 5307 of FIG. 3. The processes of steps S304 and S307 of FIG. 3 are similar to each other, and the processing illustrated by the flow chart of FIG. 7 is performed in each of steps S304 and S307. It should be noted that the steps of performing the processes similar to those of FIG. 5 are designated by the same numerals, and are not described here.

In step S506, if the determination unit 106 has determined that the captured data B[0] matches the captured data Bh (YES in step S506), the processing proceeds to step S703. If the determination unit 106 has determined that the captured data B[0] does not match the captured data Bh (NO in step S506), the processing proceeds to step S701. Here, the captured data B[0] matching the captured data Bh means that the target object placed on the reading platen has been removed.

On the other hand, the captured data B[0] not matching the captured data Bh means that the target object is present on the reading platen.

In step S701, the determination unit 106 determines whether the captured data B[T] matches the captured data Bh. If the determination unit 106 has determined that the captured data B[T] does not match the captured data Bh (NO in step S701), the processing proceeds to step S702. If the determination unit 106 has determined that the captured data B[T] matches the captured data Bh (YES in step S701), the processing returns to step S501. Here, the captured data B[T] matching the captured data Bh means that a new target object is not present on the reading platen. The captured data B[T] not matching the captured data Bh means that a new target object is present on the reading platen.

In step S702, the determination unit 106 determines that a target object has been placed.

In step S703, the determination unit 106 determines that the target object has been removed.

It should be noted that the process of step S505 may not be performed, and one of the pieces of captured data after the disappearance of the hand among the plurality of pieces of captured data held in the holding unit 102 in step S502 may be used in step S506 and S701, instead of the captured data held in the holding unit 102 in step S505. One of the pieces of captured data after the disappearance of the hand among the plurality of pieces of captured data may be, for example, the piece of captured data captured last among the plurality of pieces of captured data.

Further, in step S506 and S701, the determination unit 106 may determine whether the difference is smaller than a predetermined value, instead of determining whether there is no difference. The determination of whether the difference is smaller than the predetermined value can reduce the possibility of an erroneous recognition based on the determination that a target object has been placed when a target object has not been placed on the reading platen.

As described above, method 1 can determine, based on the contents of target object data, whether a target object has been placed or a target object has been removed.

Figure 8:
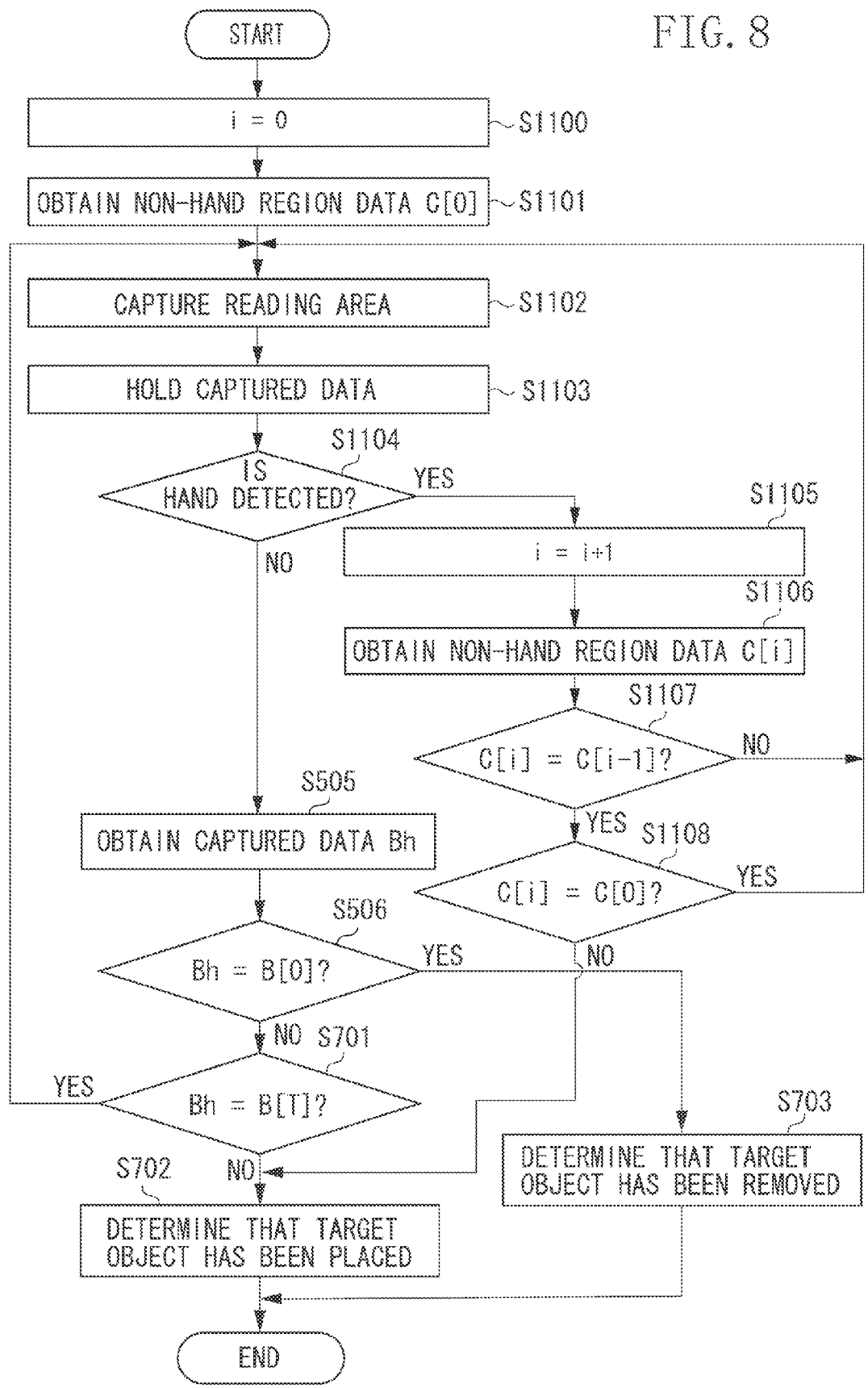
FIG. 8 is another example (method 2) of the detailed flow chart of steps S304 and S307.

FIG. 8 is another example (method 2) of the detailed flow chart of steps S304 and S307 of FIG. 3. The processes of steps S304 and S307 of FIG. 3 are similar to each other, and the processing illustrated by the flow chart of FIG. 8 is performed in each of steps S304 and S307. It should be noted that the steps of performing the processes similar to those of FIG. 7 are designated by the same numerals, and are not described here. FIG. 7 illustrates the case of first determining in step S504 that the hand has disappeared from the reading area, and then extracting a target object. In contrast, FIG. 8 illustrates a method of enabling the determination that a target object has been placed, even if the hand has not disappeared from the reading area.

In step S1100, the determination unit 106 sets i=0.

In step S1101, the detection unit 105 detects the hand from the captured data B[0] to obtain non-hand region data C[0]. Specifically, the detection unit 105 separates the region of the hand (a hand region) from the region except for the hand (a non-hand region) in the captured data B[0] to obtain the non-hand region data C[0]. The holding unit 102 holds the non-hand region data C[0].

In step S1102, the image capture unit 104 captures the reading platen.

In step S1103, the holding unit 102 holds the data captured in step S1102.

In step S1104, based on the captured data held in the holding unit 102 in step S1103, the determination unit 106 determines whether the hand is detected in the reading area. In step S1104, if the determination unit 106 has determined that the hand is detected (YES in step S1104), the processing proceeds to step S1105. If the determination unit 106 has determined that the hand is not detected (NO in step S1104), the processing proceeds to step S505.

In step S1105, the determination unit 106 sets i=i+1.

In step S1106, the detection unit 105 detects the hand from the captured data held in the holding unit 102 in step S1103, to obtain non-hand region data C[i]. The holding unit 102 holds the non-hand region data C[i].

In step S1107, the determination unit 106 determines whether the non-hand region data C[i] matches the non-hand region data C[i−1], that is, whether the non-hand region is unchanged. Here, the determination unit 106 determines the matching by comparing the pixel values of respective points of the non-hand region data C[i] and the non-hand region data C[i−1]. Specifically, if the position of the hand has changed, the determination unit 106 excludes the pixel values corresponding to the region of the hand in the non-hand region data C[i] and the non-hand region data C[i−1] from determination. In step S1107, if the determination unit 106 has determined that the non-hand region data C[i] matches the non-hand region data C[i−1] (YES in step S1107), the processing proceeds to step S1108. If the determination unit 106 has determined that the non-hand region data C[i] does not match the non-hand region data C[i−1] (NO in step S1107), the processing returns to step S1102.

In step S1108, the determination unit 106 determines whether the non-hand region data C[i] matches the non-hand region data C[0]. Similarly to step S1107, the determination unit 106 determines the matching by comparing the pixel values of respective points of the non-hand region data C[i] and the non-hand region data C[0]. In step S1108, if the determination unit 106 has determined that the non-hand region data C[i] matches the non-hand region data C[0] (YES in step S1108), the processing returns to step S1102. If the determination unit 106 has determined that the non-hand region data C[i] does not match the non-hand region data C[0] (NO in step S1108), the processing proceeds to step S702. Here, the non-hand region data C[i] matching the non-hand region data C[0] means that a new target object has not been placed. On the other hand, the non-hand region data C[i] not matching the non-hand region data C[0] means that a target object has been placed.

As described above, method 2 can determine that a target object has been placed, even if the hand has not disappeared from the reading area.

Figure 9:
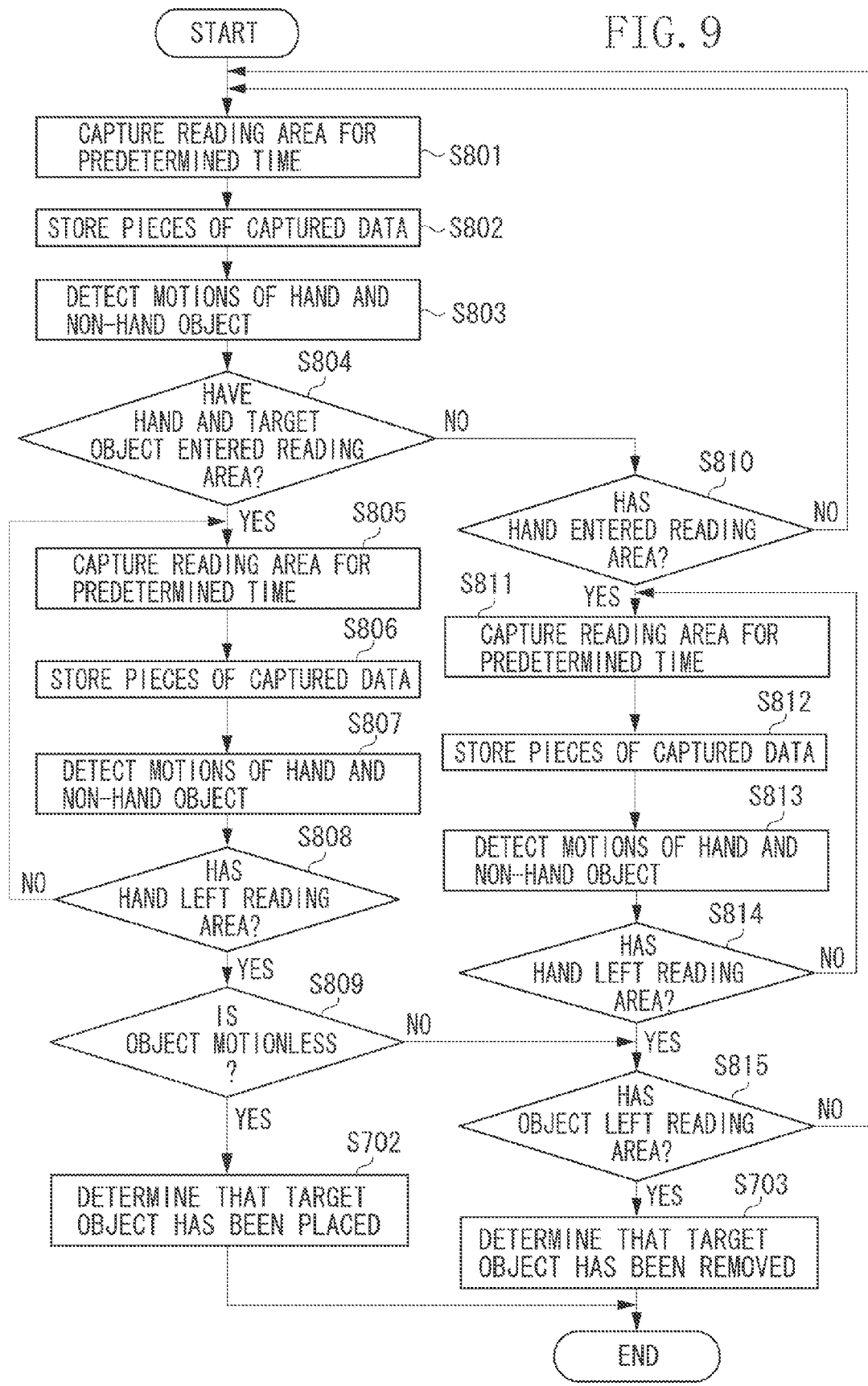
FIG. 9 is another example (method 3) of the detailed flow chart of steps S304 and S307.

FIG. 9 is another example (method 3) of the detailed flow chart illustrating steps S304 and S307 of FIG. 3. The processes of steps S304 and S307 of FIG. 3 are similar to each other, and the processing illustrated by the flow chart of FIG. 9 is performed in each of steps S304 and S307. It should be noted that the steps of performing the processes similar to those of FIG. 7 are designated by the same numerals, and are not described here. In FIG. 7, the determination unit 106 uses the contents of target object data (the pixel values of target object data) to determine whether a target object has been placed or a target object has been removed. FIG. 9, on the other hand, illustrates a method of making the determination based on the motion of the hand and the motion of a target object (method 3).

In FIG. 9, in step S801, the image capture unit 104 captures the reading area on the reading platen multiple times at predetermined time intervals.

In step S802, the holding unit 102 holds the plurality of pieces of captured data captured by the image capture unit 104 in step S801.

In step S803, the detection unit 105 detects the motion of the hand and the motion of an object other than the hand (a non-hand object; a target object) using the plurality of pieces of captured data held in the holding unit 102. The detection unit 105 uses an existing technique to detect the hand. Examples of the technique include a method of determining a flesh color to detect the hand, and a method of identifying a shape to detect the hand. Further, the detection unit 105 uses an existing technique for a method of detecting a non-hand object. For example, the detection unit 105 extracts a moving object based on the temporal difference between the pieces of captured data obtained in a time-sequential manner, eliminates the hand detected by the detection unit 105 from the extracted moving object, and determines the remaining portion as a non-hand object.

In step S804, the determination unit 106 determines whether the hand and the non-hand object, that is, the hand and the target object, have entered the reading area. The determination unit 106 makes the determination using the motion of the hand and the motion of the non-hand object that have been detected by the detection unit 105 in step S803. If the determination unit 106 has determined that the hand and the target object have entered the reading area (YES in step S804), the processing proceeds to step S805. If the determination unit 106 has determined that the hand and the target object have not entered the reading area (NO in step S804), the processing proceeds to step S810.

The processes of steps S805, S806, and S807 are similar to those of steps S801, S802, and S803, respectively.

In step S808, the determination unit 106 determines whether the hand has left the reading area. The determination unit 106 makes the determination using the motion of the hand detected by the detection unit 105 in step S807. If the determination unit 106 has determined that the hand has left the reading area (YES in step S808), the processing proceeds to step S809. If the determination unit 106 has determined that the hand has not left the reading area (NO in step S808), the processing returns to step S805.

In step S809, the determination unit 106 determines whether the object (the target object) in the reading area is motionless. The determination unit 106 makes the determination using the motion of the non-hand object detected by the detection unit 105 in step S807. If the determination unit 106 has determined that the object (the target object) in the reading area is motionless (YES in step S809), the processing proceeds to step S702. If the determination unit 106 has determined that the object (the target object) in the reading area is moving (NO in step S809), the processing proceeds to step S815.

In step S810, the determination unit 106 determines whether the hand has entered the reading area. The determination unit 106 makes the determination using the motion of the hand detected by the detection unit 105 in step S803. If the determination unit 106 has determined that the hand has entered the reading area (YES in step S810), the processing proceeds to step S811. If the determination unit 106 has determined that the hand has not entered the reading area (NO in step S810), the processing returns to step S801.

The processes of steps S811, S812, and S813 are similar to those of steps S801, S802, and S803, respectively.

In step S814, the determination unit 106 determines whether or not the hand has left the reading area. The determination unit 106 makes the determination using the motion of the hand detected by the detection unit 105 in step S813. If the determination unit 106 has determined that the hand has left the reading area (YES in step S814), the processing proceeds to step S815. If the determination unit 106 has determined that the hand has not left the reading area (NO in step S814), the processing returns to step S811.

In step S815, the determination unit 106 determines whether the object (the target object) has left the reading area. If the process has proceeded from step S809 to step 815, the determination unit 106 makes the determination using the motion of the non-hand object detected by the detection unit 105 in step S807. If, on the other hand, the process has proceeded from step S814 to step 815, the determination unit 106 makes the determination using the motion of the non-hand object detected by the detection unit 105 in step S813. If the determination unit 106 has determined that the object (the target object) has left the reading area (YES in step S815), the processing proceeds to step S703. If the determination unit 106 has determined that the object (the target object) has not left the reading area (NO in step S815), the processing ends.

As described above, method 3 can determine, based on the motions of the hand and a target object, whether a target object has been placed or a target object has been removed without using the contents of target object data. This can reduce the load on the process of comparing the contents of target object data.

Figure 10:
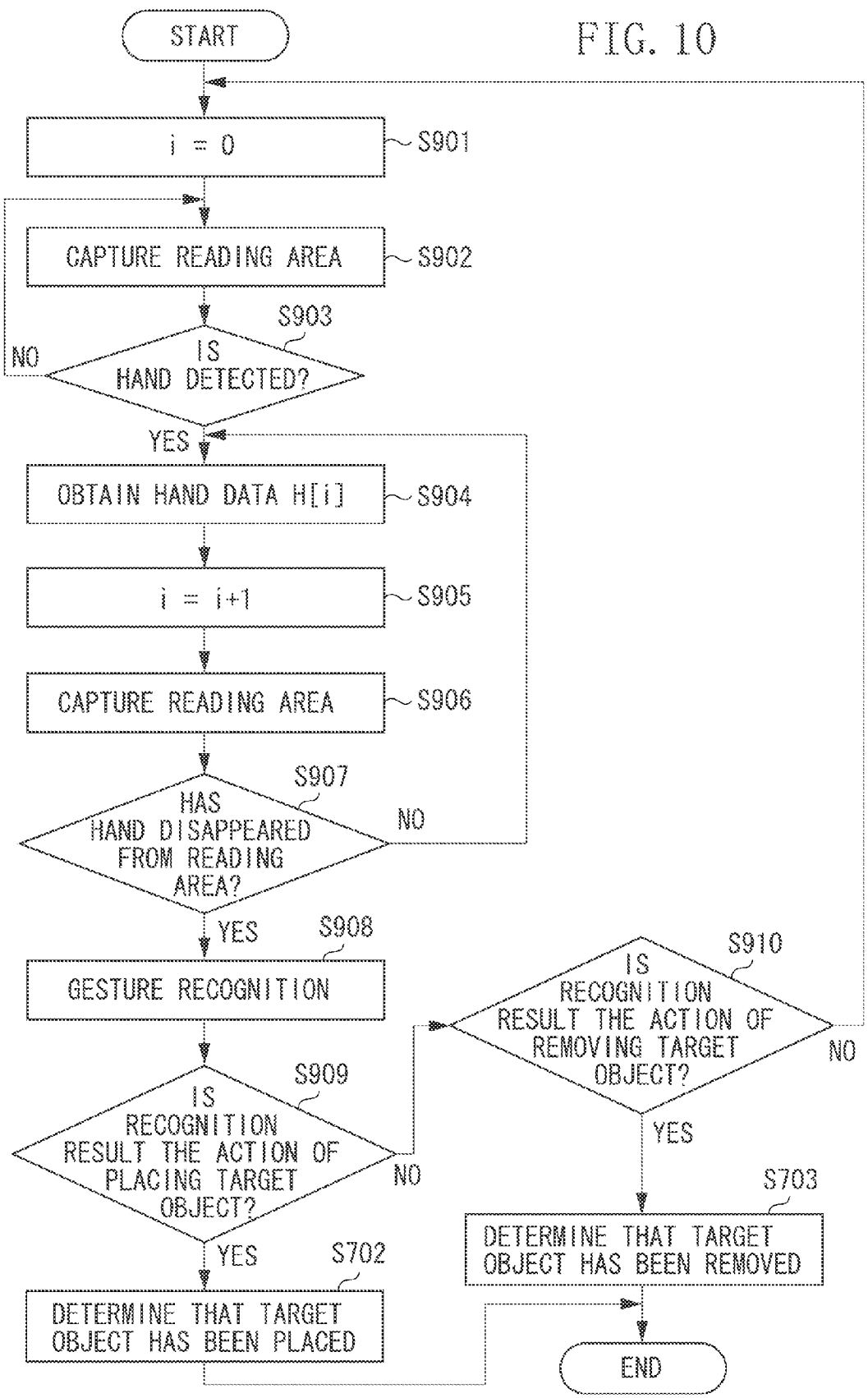
FIG. 10 is another example (method 4) of the detailed flow chart of steps S304 and S307.

FIG. 10 is another example (method 4) of the detailed flow chart illustrating steps S304 and S307 of FIG. 3. The processes of steps S304 and S307 of FIG. 3 are similar to each other, and the processing illustrated by the flow chart of FIG. 10 is performed in each of steps S304 and S307. It should be noted that the steps of performing the processes similar to those of FIG. 7 are designated by the same numerals, and are not described here. In FIG. 7, the determination unit 106 uses the contents of target object data to determine whether a target object has been placed or a target object has been removed. FIG. 10, on the other hand, illustrates a method of making the determination based on the motion of the hand (method 4).

In step S901, the determination unit 106 sets i=0.

In step S902, the image capture unit 104 captures the reading area on the reading platen. The holding unit 102 holds the captured data captured by the image capture unit 104.

In step S903, based on the captured data held in the holding unit 102 in step S902, the determination unit 106 determines whether the hand of the user is detected. If the determination unit 106 has determined that the hand is detected (YES in step S903), the processing proceeds to step S904. If the determination unit 106 has determined that the hand is not detected NO in step S903), the processing returns to step S902.

In step S904, the detection unit 105 obtains data of the hand as hand data H[i] from the captured data captured in step S902. The holding unit 102 holds the hand data H[i].

In step S905, the determination unit 106 sets i=i+1.

In step S906, the image capture unit 104 captures the reading area on the reading platen. The holding unit 102 holds the captured data captured by the image capture unit 104.

In step S907, the determination unit 106 determines whether the hand has disappeared from the reading area. The determination unit 106 makes the determination using the data captured in step S906 and based on whether the hand is detected. If the determination unit 106 has determined that the hand has disappeared from the reading area (YES in step S907), the processing proceeds to step S908. If the determination unit 106 has determined that the hand is present in the reading area (NO in step S907), the processing returns to step S904.

In step S908, the detection unit 105 performs gesture recognition based on the pieces of data H[0] to H[i] held in the holding unit 102. The detection unit 105 uses a conventional technique for the gesture recognition. For example, the detection unit 105 prepares in advance action patterns including, for example, the action of placing a target object and the action of removing a target object. The detection unit 105 defines the pieces of data H[0] to H[i] as an input action pattern and calculates the distance between the input action pattern and each of the action patterns, namely the action of placing a target object and the action of removing a target object. The detection unit 105 determines that the action pattern having the smaller distance from the input action pattern is the recognition result.

In step S909, the determination unit 106 determines whether the recognition result obtained from the action subjected to the gesture recognition in step S908 is the action of placing a target object. If the determination unit 106 has determined that the recognition result is the action of placing a target object (YES in step S909), the processing proceeds to step S702. If the determination unit 106 has determined that the recognition result is not the action of placing a target object (NO in step S909), the processing proceeds to step S910.

In step S910, the determination unit 106 determines whether the recognition result obtained from the action subjected to gesture recognition in step S908 is the action of removing a target object. If the determination unit 106 has determined that the recognition result is the action of removing a target object (YES in step S910), the processing proceeds to step S703. If the determination unit 106 has determined that the recognition result is not the action of removing a target object (NO in step S910), the processing proceeds to step S901.

As describe above, method 4 can determine, by examining only the motion of the hand, whether a target object has been placed or a target object has been removed. This can reduce the load on the process of comparing the contents of target object data.

Figure 11:
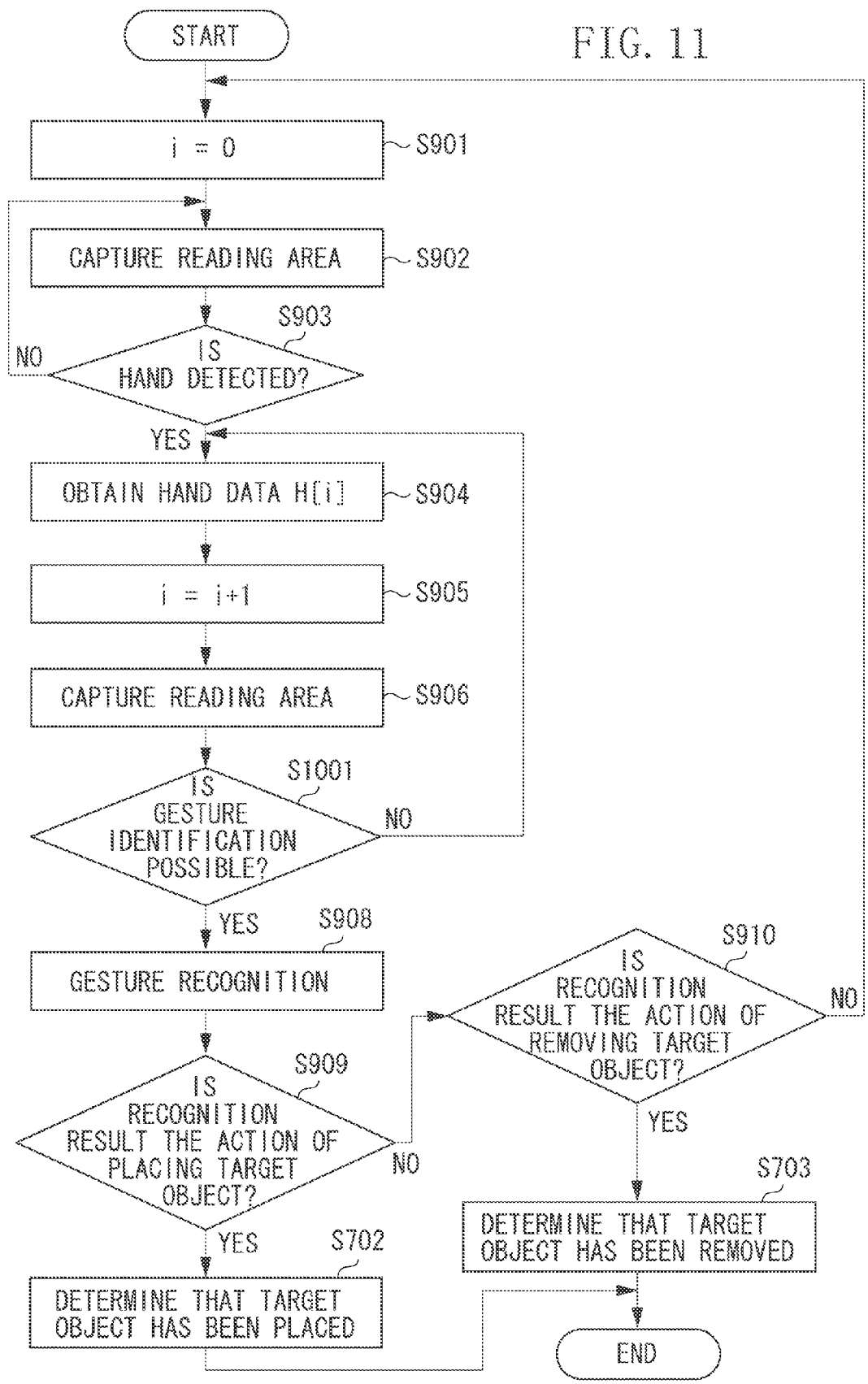
FIG. 11 is another example (method 5) of the detailed flow chart of steps S304 and S307.

FIG. 11 is another example (method 5) of the detailed flow chart illustrating steps S304 and S307 of FIG. 3. The processes of steps S304 and S307 of FIG. 3 are similar to each other, and the processing illustrated by the flow chart of FIG. 11 is performed in each of steps S304 and S307. It should be noted that the steps of performing the processes similar to those of FIG. 7 are designated by the same numerals, and are not described here. Further, the steps of performing the processes similar to those of FIG. 10 are designated by the same numerals, and are not described here.

FIG. 10 illustrates the case of waiting for the hand to disappear from the reading area in step S907, and then performing gesture recognition. In contrast, FIG. 11 illustrates a method of performing gesture recognition without waiting for the hand to disappear from the reading area (method 5).

In step S1001, the determination unit 106 determines whether gesture recognition is possible. The determination unit 106 makes the determination based on whether a predetermined time has elapsed since the detection of the hand in step S903, or based on whether the position of the hand has moved through a predetermined distance or more. That is, as described above, method 5 can determine, by examining only the motion of the hand, whether a target object has been placed or a target object has been removed, even if the hand is present in the reading area.

Figure 12:
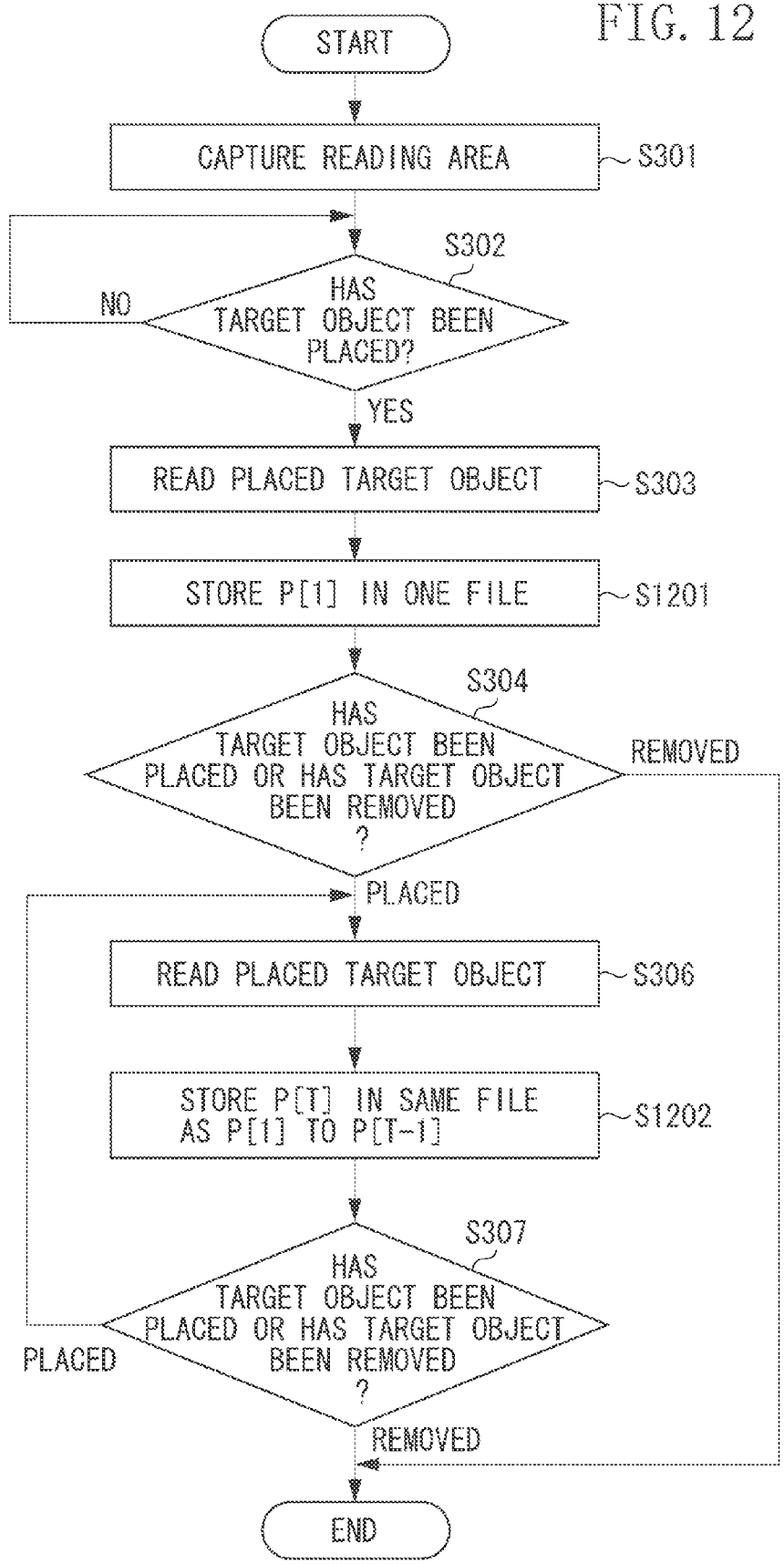
FIG. 12 is a flow chart illustrating the processing performed by the reading apparatus 101 according to a variation of the first exemplary embodiment.

FIG. 12 is another example (a variation) of the flow chart illustrating the processing performed by the reading apparatus 101. The steps of performing the processes similar to those of FIG. 3 are designated by the same numerals, and are not described here. FIG. 3 illustrates the example where, after the detection of the removal of the target object, the piece(s) of target object data is (are) stored in one file. In contrast, FIG. 12 illustrates the example where, when a target object has been read, the piece(s) of target object data is (are) stored in a file.

In step S1201, the association unit 110 stores target object data P[1] in one file. Here, the association unit 110 stores the target object data held in the holding unit 102 in step S303, as target object data P[1] in one file in the storage device 108. In the illustrated example, the association unit 110 stores the data in the storage device 108 which is an external storage device. Alternatively, the holding unit 102 provided within the reading apparatus 101 may hold the data.

In step S1202, the association unit 110 stores the target object data P[T] in the same file as that of the plurality of pieces of previously read target object data (P[1] to P[T−1]). Here, the association unit 110 adds the target object data P[T] as a piece of data to the file of the plurality of pieces of previously read target object data (P[1] to P[T−1]), thereby storing the resulting file as one file in the storage device 108. In the illustrated example, the association unit 110 stores the file in the storage device 108 which is an external storage device. Alternatively, the holding unit 102 provided within the reading apparatus 101 may hold the file.

Thus, the first exemplary embodiment describes the case of placing a plurality of target objects in order in the reading area, and associating the target objects with one another. It is, however, possible to associate the target objects with one another also in the case of first placing in the reading area a plurality of target objects to be stored in one file, and sequentially removing the target objects one by one. In this case, in steps S304 and S307 of FIG. 3, the determination unit 106 determines whether one of the target objects has been removed or all of the target objects have been removed. Further, the read data of the target object detected by the target object data generation unit 103 is a difference region between the captured data before the removal of one of the target objects and the captured data after the removal. Specifically, the determination unit 106 extracts B[T−1]−B[T], so that data corresponding to the difference region in the captured data B[T−1] is the target object data P[T]. Further, if the determination unit 106 determines whether one of the target objects has been removed, the number of the removed target objects does not necessarily need to be one. In this case, the determination unit 106 may determine whether any of the target objects has been removed with the other target objects left in the reading area. In the present exemplary embodiment, the expression "the target object has been removed" is equivalent to the expression "the target object is not present in the reading area". The expression "a target object has been placed" is equivalent to the expression "a new target object is present in the reading area". In other words, if the target object has disappeared from the reading area, a file of the pieces of previously read target object data may be generated. Thus, the user may perform the action of placing a plurality of target objects in order in the reading area, or the action of removing a plurality of target objects in order from the reading area.

As described above, in the first exemplary embodiment, in steps S304 and S307 of FIG. 3, the determination unit 106 determines whether a new target object (a second target object) has been placed in the reading area on the reading platen or whether the target object (a first target object) placed in the reading area has been removed. Here, it is assumed that either the action of placing a target object or the action of removing a target object is performed. In other words, these steps are equivalent to the process of determining whether a new target object (the second target object) has been placed in the reading area without removing the target object (the first target object) placed in the reading area on the reading platen.

A second exemplary embodiment is described. The first exemplary embodiment describes the example where the determination unit 106 determines whether a target object has been placed or a target object has been removed, and if a target object has been placed without removing an already placed target object, the association unit 110 stores the target objects together in one file. The present exemplary embodiment illustrates the example where a set of target objects (a target object region) formed by stacking target objects one on top of another is identified, thereby storing target objects together in one file with respect to each target object region. On the other hand, a target object (or a set of target objects) not overlapping the target object region is determined as a set different from that of the target object region, and is stored in a file different from that of the target object region.

FIG. 1B is a functional block diagram illustrating a reading apparatus 101 according to the second exemplary embodiment. The components other than a region obtaining unit 111 are similar to those of FIG. 1A. Thus, the components of the functional block similar to that of FIG. 1A are designated by the same numerals, and are not described here.

The region obtaining unit 111 obtains a target object region from captured data of the reading area captured by the image capture unit 104. Further, if a new target object has been placed in the reading area, the region obtaining unit 111 obtains the region of the new target object as an updated region.

Figure 15A:
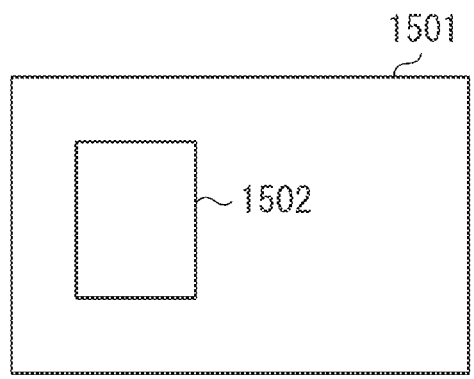
FIGS. 15A, 15B, 15C, 15D, 15E, and 15F are diagrams illustrating target object regions.
Figure 15D:
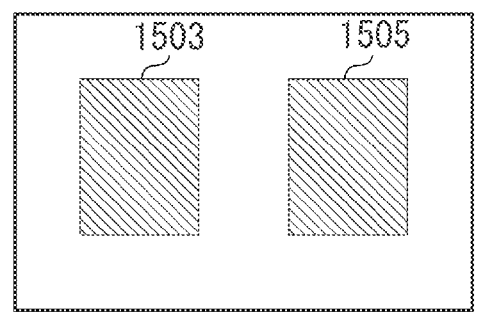
Figure 15B:
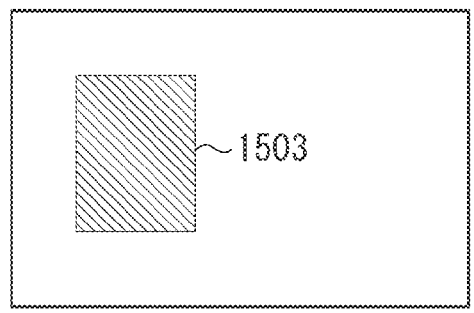

FIGS. 15A to 15F are diagrams illustrating target object regions. FIGS. 15A to 15F illustrate a reading area 1501 on the reading platen. FIG. 15A is a diagram illustrating the state where a first target object is placed in a region 1502 in the reading area. FIG. 15B illustrates a first target object region 1503, which is obtained after the first target object is placed.

Figure 15E:
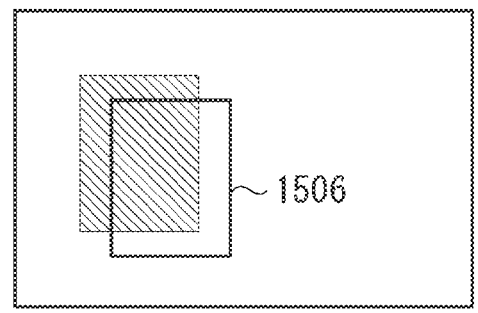
Figure 15C:
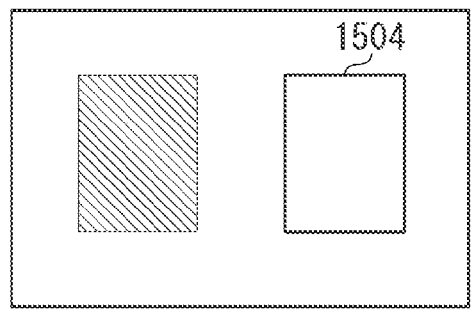
Figure 15F:
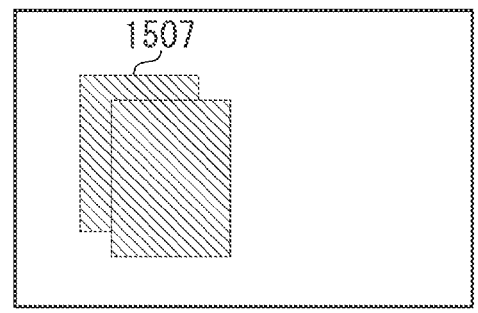

FIG. 15C is a diagram illustrating the state where a second target object is placed in a region 1504 in the reading area on the reading platen so as not to overlap the first target object region 1503. FIG. 15D illustrates a second target object region 1505, which is obtained after the second target object is placed. Here, if the second target object has been placed so as not to overlap the first target object region 1503, the second target object region 1505 is newly added. A target object region is thus generated for each region where target objects overlap each other.

FIG. 15E is a diagram illustrating the state where a target object is placed in a region 1506 in the reading area so as to overlap the first target object region 1503. If a target object has been placed in the region 1506 in the reading area so as to overlap the first target object region 1503, the first target object region 1503 is updated as a region 1507 in FIG. 15F.

Figure 13:
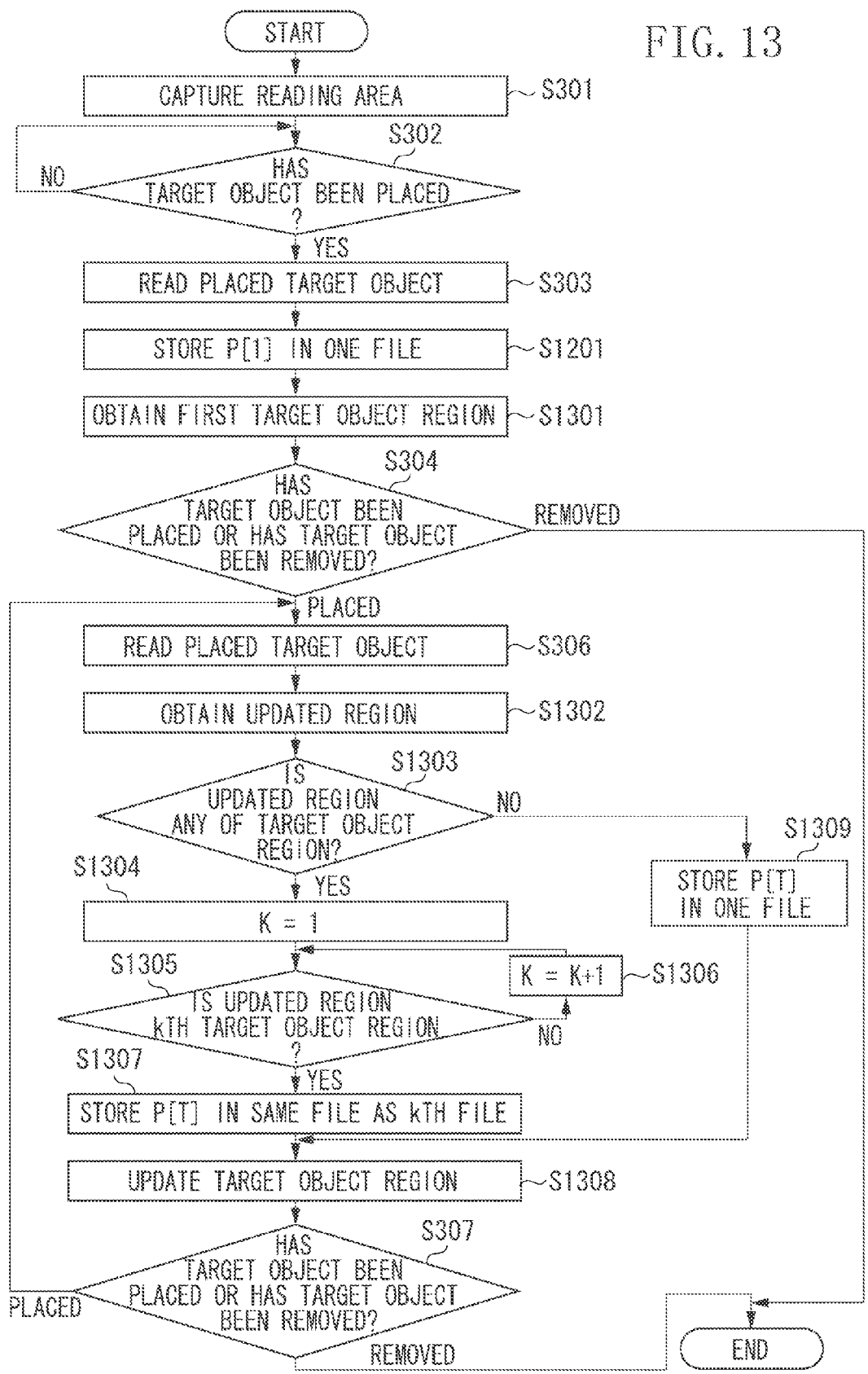
FIG. 13 is a flow chart illustrating the processing performed by a reading apparatus 101 according to a second exemplary embodiment.

FIG. 13 is a flow chart illustrating the processing performed by the reading apparatus 101 according to the second exemplary embodiment. The steps of performing the processes similar to those of FIG. 12 are designated by the same numerals, and are not described here.

In step S1301, the region obtaining unit 111 obtains a first target object region. The first target object region corresponds to the first target object region 1503 in FIG. 15.

In step S1302, the region obtaining unit 111 obtains an updated region indicating the region where the target object has been placed. The updated region corresponds to the region 1504 in FIG. 15C or the region 1506 in FIG. 15E.

In step S1303, the determination unit 106 determines whether the updated region is any of the target object regions.

In step S1304, the determination unit 106 sets k=1.

In step S1305, the determination unit 106 determines whether the updated region is a kth target object region.

In step S1306, the determination unit 106 sets k=k+1.

In step S1307, the association unit 110 associates the target object data P[T] with a kth file. The association unit 110 adds the target object data P[T] to the end of the kth file, thereby forming one file.

In step S1308, the region obtaining unit 111 updates the target object regions.

In step S1309, the association unit 110 stores the target object data P[T] in one file.

It should be noted that in the present exemplary embodiment, the flow of each of steps S304 and S307 of FIG. 13 may be any of the flows of FIGS. 7, 8, 9, 10, and 11.

As described above, the generation of a file for each region where target objects overlap each other enables the user to store target objects in a plurality of desired files without explicitly designating files.

A third exemplary embodiment is described. The first exemplary embodiment describes the case of placing a target object without removing an already placed target object, thereby storing the target objects together in one file. The present exemplary embodiment describes a method capable of, in a case where all the target objects cannot be placed on the reading platen or the target objects start scattering on the reading platen, storing the pieces of data of the target objects together in one file even after once removing the target objects from the reading platen. Specifically, in a case where X+A documents are stored in one file, the user places the first to Xth documents in order on the reading platen. Thereafter, the user removes the first to Xth documents from the reading platen and places the Xth document again. Thereafter, the user places the X+1th, . . . , and X+Ath documents in order on the reading platen, thereby storing the first to X+Ath documents in one file. Here, if the document placed last in the reading area among the removed target objects matches the Xth document placed first after the removal in the reading area, it is determined that these documents belong to consecutive files.

A functional block diagram of a reading apparatus 101 according to the third exemplary embodiment is similar to that of FIG. 1A.

In the present exemplary embodiment, the association unit 110 associates files with one another such that the order of the associated files can be understood. Further, it is defined that pieces of data in a file associated in an S−1th order are P[S−1][1], P[S−1][2], . . . , and P[S−1][L] in the order of reading. The data P[S−1][L] represents the target object data read last in the file associated in the S−1th order.

Figure 14:
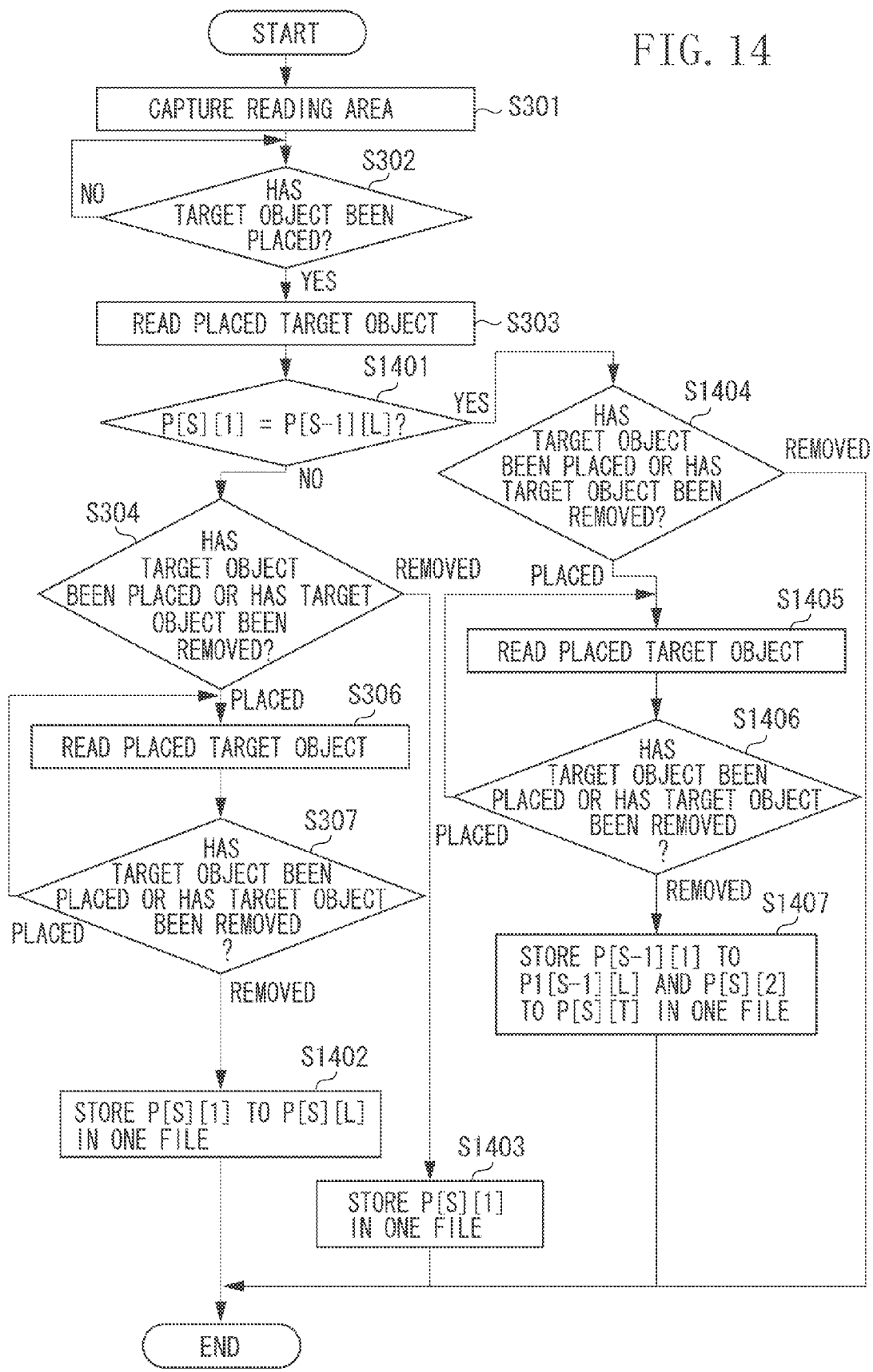
FIG. 14 is a flow chart illustrating the processing performed by a reading apparatus 101 according to a third exemplary embodiment.

FIG. 14 is a flow chart illustrating the processing performed by the reading apparatus 101 according to the third exemplary embodiment. The steps of performing the processes similar to those of FIG. 3 are designated by the same numerals, and are not described here.

In step S1401, the determination unit 106 determines whether target object data P[S][1] read in step S303 matches target object data P[S−1][L] already stored in a file (matching determination). If the determination unit 106 has determined that the target object data P[S][1] matches the target object data P[S−1][L] (YES in step S1401), the processing proceeds to step S1404. If the determination unit 106 has determined that the target object data P[S][1] does not match the target object data P[S−1][L] (NO in step S1401), the processing proceeds to step S304.

In step S1402, the association unit 110 stores the pieces of target object data P[S][1] to P[S][L] in one file.

In step S1403, the association unit 110 stores the target object data P[S][1] in one file.

The processes of steps S1404, S1405, and S1406 are similar to those of steps S304, S306, and S307 of FIG. 3, respectively.

In step S1407, the association unit 110 stores the pieces of target object data P[S−1][1] to P[S−1][L] and the pieces of target object data P[S][2] to P[S][T] in one file. Here, the association unit 110 adds the pieces of target object data P[S][2] to P[S][T] to the pieces of target object data P[S−1][1] to P[S−1][L] already stored in a file, thereby forming one file.

Further, in steps S1402, S1403, and S1407, the association unit 110 adds file numbers to the respective files generated by associating the files with one another such that the order of the associated files can be distinguished. Alternatively, the association unit 110 may add identification information so that the file associated last can be distinguished.

As described above, it is possible to store the pieces of data of target objects together in one file even after once removing the target objects from the reading platen.

Further, in step S1401, the determination unit 106 may additionally determine whether the target object data P[S][1] has been generated within a predetermined time after the generation of the target object data P[S−1][L]. In this case, the determination unit 106 determines whether the target object data P[S][1] read instep S303 matches the target object data P[S−1][L] (condition 1), and also determines whether the target object data P[S][1] has been generated within the predetermined time after the generation of the target object data P[S−1][L] (condition 2). Only if YES in both condition 1 and condition 2, the processing proceeds to step S1404. If NO in either condition 1 or condition 2, the processing proceeds to step S304.

Thus, the consideration of condition 2 in addition to condition 1 enables, for example, another user to exclude data if wishing to store the data in another file.

It should be noted that in the present exemplary embodiment, the flow of each of steps S304 and S307 of FIG. 14 may be any of the flows of FIGS. 7, 8, 9, 10, and 11.

The exemplary embodiment described above can reduce explicit instructions from the user to combine a plurality of documents into one file.

The above exemplary embodiments describe the case where associated pieces of data of target objects are stored in one file, but are not limited to this. Alternatively, associated pieces of data of target objects may be subjected to given processing. For example, associated pieces of data of target objects may be stored in a database. As another example, associated pieces of data of target objects may be transmitted (for example, emailed) as integrated data to a network via the communication apparatus 208. As yet another example, associated pieces of data of target objects may be subjected to two-sided printing, or a plurality of pages may be reduced to one page and printed, via the printer 207.

Further, in the above exemplary embodiments, a target object serving as a reading target may be a document such as paper, and may also be applicable to an object having a thickness and an object having a three-dimensional shape.

Based on the exemplary embodiments described above, it is possible to associate a plurality of pieces of read target object data with one another based on an action performed on a target object by a user.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2012-129884 filed Jun. 7, 2012, and Japanese Patent Application No. 2013-097733 filed May 7, 2013 each of which is hereby incorporated by reference herein in its entirety.

What is claimed is:

1. An information processing apparatus comprising:
    a generation unit configured to generate data of a first target object obtained by using an image capture unit to read the first target object placed in a reading area of a reading platen and configured to generate data of a second target object obtained by using the image capture unit to read the second target object placed in the reading area;
    a determination unit configured to determine whether the second target object, different from the first target object, has been placed on the reading area by a user in a state where the first target object is placed on the reading area, or the first target object has been removed from the reading area by the user; and
    an association unit configured to store, in response to the determination unit determining that the second target object has been placed in the reading area, the data of the first target object and the data of the second target object in one file and, in response to the determination unit determining that the first target object has been removed from the reading area, store the first target object data and the second target object data in different files.

2. The information processing apparatus according to claim 1, further comprising:
    a first captured data obtaining unit configured to obtain, in response to the first target object being placed in the reading area, first captured data obtained by capturing the reading area; and
    a second captured data obtaining unit configured to obtain, after a hand of the user disappears from the reading area, second captured data obtained by capturing the reading area,
    wherein the determination unit makes the determination using the first captured data and the second captured data.

3. An information processing apparatus comprising:
    a generation unit configured to generate data of a first target object obtained by using an image capture unit to read the first target object placed in a reading area of a reading platen and configured to generate data of a second target object obtained by using the image capture unit to read the second target object placed on the reading area;

a determination unit configured to determine, in a state where the first target object is placed on the reading area, whether the second target object, different from the first target object, has been placed on the reading area by a user;

an association unit configured to associate, in response to the determination unit determining that the second target object has been placed on the reading area, the data of the first target object with the data of the second target object data; and a detection unit configured to detect a motion of a hand of the user, wherein the determination unit makes the determination based on the motion of the hand of the user detected by the detection unit.

4. The information processing apparatus according to claim 3, wherein the detection unit further detects a motion of a target object, and wherein the determination unit makes the determination based on the motion of the hand of the user detected by the detection unit and the motion of the target object detected by the detection unit.

5. An information processing apparatus comprising:

a generation unit configured to generate data of a first target object obtained by using an image capture unit to read the first target object placed in a reading area of a reading platen and configured to generate data of a second target object obtained by using the image capture unit to read the second target object placed on the reading area;

a determination unit configured to determine, in a state where the first target object is placed on the reading area, whether the second target object, different from the first target object, has been placed on the reading area by a user;

an association unit configured to associate, in response to the determination unit determining that the second target object has been placed on the reading area, the data of the first target object with the data of the second target object data; and a region obtaining unit configured to obtain a target object region including the first target object placed on the reading area, wherein the determination unit determines, in a state where the first target object is placed on the reading area, whether the second target object has been placed by the user to overlap the obtained target object region including the first target object, and wherein the association unit associates, in response to the determination unit determining that the second target object has been placed to overlap the target object region including the first target object, the data of the first target object with the data of the second target object.

6. The information processing apparatus according to claim 5, wherein the association unit does not associate, in response to the determination unit determining that the second target object has not been placed to overlap the target object region including the first target object, the data of first target object with the data of the second target object.

7. The information processing apparatus according to claim 1, further comprising a matching determination unit configured to determine whether target object data already stored in a file matches the data of the first target object, wherein, in response to the matching determination unit determining that the data of the target object already stored in the file matches the data of the first target object, the association unit associates the data of the target object already stored in the file with the data of the first target object.

8. A method of controlling an information processing apparatus, the method comprising:

generating data of a first target object obtained by using an image capture unit to read the first target object placed in a reading area of a reading platen and generating data of a second target object obtained by using the image capture unit to read the second target object placed in the reading area;

determining whether the second target object, different from the first target object, has been placed on the reading area by a user in a state where the first target object is placed on the reading area, or the first target object has been removed from the reading area by the user; and storing, in response to determining that the second target object has been placed in the reading area, the data of the first target object and the data of the second target object in one file and, in response to determining that the first target object has been removed from the reading area, storing the first target object data and the second target object data in different files.

9. A non-transitory computer-readable storage medium storing a program to cause an information processing apparatus to perform the method according to claim 8.

10. The information processing apparatus according to claim 1, wherein the image capture unit is attached above the reading platen.

11. The information processing apparatus according to claim 1, wherein the image capture unit captures images of the reading platen from above.

* * * * *